June 4, 1940.　　S. C. LEONARD, JR　　2,203,164

SEAL

Filed June 2, 1938

INVENTOR
SIMPSON C. LEONARD Jr.
BY
LaRue W. Patee
ATTORNEY

Patented June 4, 1940

2,203,164

UNITED STATES PATENT OFFICE 2,203,164

SEAL

Simpson C. Leonard, Jr., Detroit, Mich.

Application June 2, 1938, Serial No. 211,347

1 Claim. (Cl. 288—3)

This invention relates to a seal and more particularly to a seal adapted to be inserted in a housing in encompassing relation to a rotatable member.

An object of the invention is to provide a seal particularly adapted to be inserted in a housing having a relatively large opening or bore within which is disposed a rotatable member having a diameter substantially less than the corresponding dimension or the bore, thereby requiring the use of a seal having a relatively large overall diameter.

Another object of the invention is to provide a seal having an inherent resiliency and which will expand radially for maintaining a substantially constant pressure and sealing effect on the associated shaft in response to an eccentric relationship of the shaft with respect to the bore.

Other objects and advantages of the invention will be more apparent from the following description taken in connection with the accompanying drawing, in which.

Figure 1:
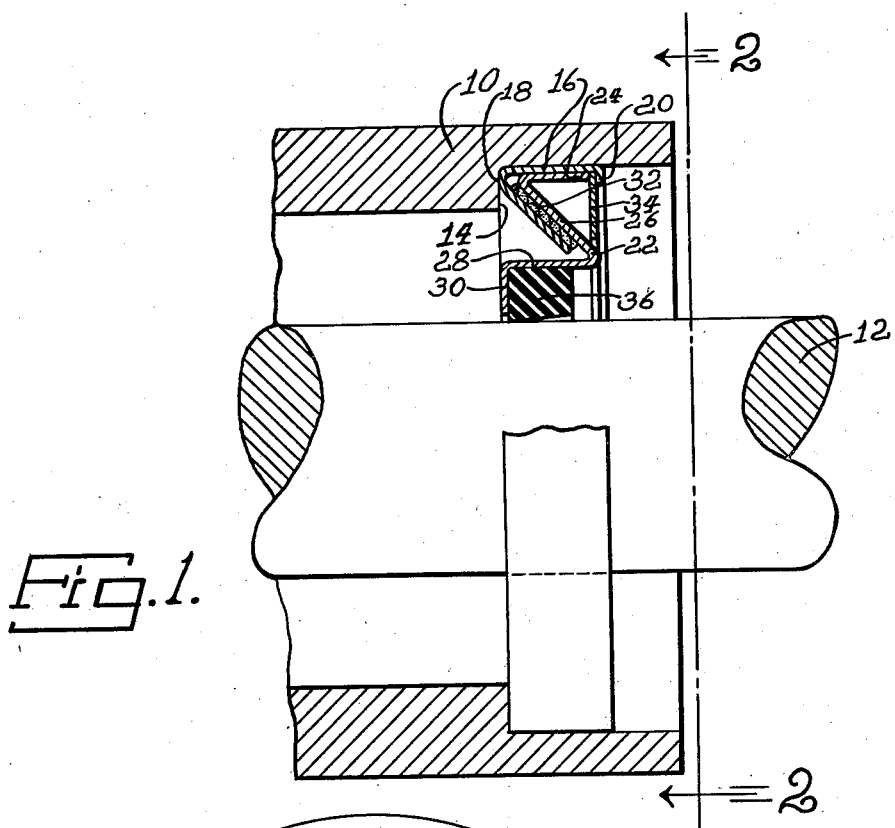
Fig. 1 is a longitudinal sectional view through a housing showing the improved seal inserted therein in encompassing relation to a shaft.
Figure 2:
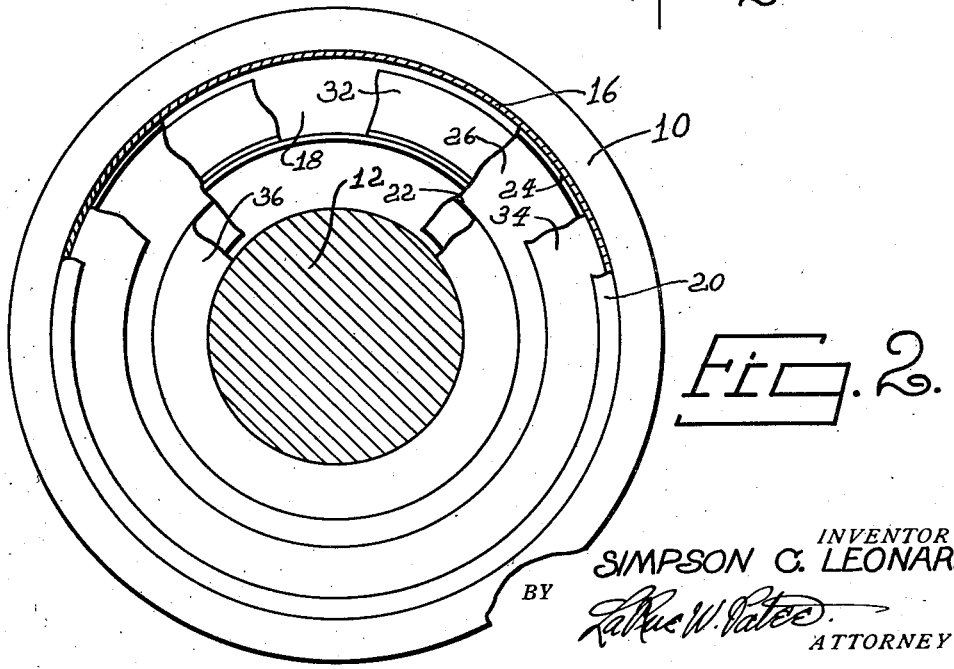
Fig. 2 is a transverse sectional view taken as indicated by the line 2—2 of Fig. 1.

Referring to the drawing, the seal is illustrated in connection with a housing 10 having a bore or opening receiving a shaft 12, the diameter of the bore being substantially greater than the corresponding dimension of the shaft. The improved seal is seated axially against a shoulder 14 provided by the housing counterbore. The seal includes an annular housing, preferably of spring steel, having an axially extending peripheral portion 16 having spaced side walls 18 and 20. The wall 18 extends generally diagonally from a point adjacent the juncture thereof with the portion 16. The wall 18 extends radially inwardly beyond the wall 20.

An annular ring member, generally designated by the numeral 22, has a V-shaped portion in cross section including an axially extending flange 24 abutting the inner face of flange 16 of the housing and a second flanged portion 26 extending generally parallel with the flanged portion of the housing wall 18. The ring member 22 is also provided with an axially extending flange 28, radially spaced from flange 24, and a radially extending flange terminal portion 30, it being understood that the portions 24, 26, 28 and 30 are integral.

Interposed between the portion 18 of the housing and flange 26 of the ring 22 is an annular washer 32, preferably of a composition non-metallic material, and which forms a seal between the aforesaid portions, the washer preferably being placed under a compressive force during assembly. The ring member 22 is retained against displacement by a washer 34 retained against the end face of the flange 24 of the ring by the housing side wall 20.

Attached to the ring member 22 is a ring-shaped packing member 36 having right angularly disposed face portions abutting the adjacent face portions of the flanges 28 and 30 respectively of the ring 22. The packing 36 preferably comprises a resilient material, such as synthetic rubber having the characteristics of natural rubber but which will not deteriorate in the presence of oils or greases. In formation, the packing 36 is preferably moulded to the desired shape and then bonded or otherwise suitably secured to the flanges 28 and 30. The radially disposed innermost wall of the packing is tapered so that only a portion thereof engages the periphery of the shaft 12.

In addition to the resiliency inherent in the packing 36, the metallic portions of the seal possess a certain resiliency. This is especially true in the formation of the flanges 18 and 28, the juncture thereof providing in effect a hinge permitting the seal to accommodate itself to a condition where the shaft 12 is disposed eccentric with respect to the bore axis and thus at all times maintaining an efficient sealing relation.

Various changes including the size, shape and arrangement of parts may be made without departing from the spirit of the invention and it is not my intention to limit the scope thereof other than by the terms of the appended claim.

What I claim is:

A seal for application as an assembled unit about a shaft comprising an annular housing having an outer axially extending wall and a side wall extending diagonally toward the axis of said housing, said walls forming a substantially V-shaped structure in cross section, a packing carrying member in said housing including an outer axially extending portion abutting said housing outer wall and a flanged part, a portion of the latter extending diagonally toward said housing axis and another portion thereof extending substantially axially with respect to said housing, said flanged part terminating in a radially extending portion, said outer axially extending portion and said diagonally extending portion forming a substantially V-shaped structure in cross section nested in said first mentioned V- shaped structure, a packing member having angularly disposed face portions moulded to the adjacent face portions respectively of the radially and axially extending portions of said flanged part, a radially extending washer abutting the free outer edge of the axially extending portion of said packing carrying member and closing the open portion of the V-shaped structure, and a turned over portion of said housing on said washer holding said parts in assembled relation as a unit.

SIMPSON C. LEONARD, Jr.